(12) United States Patent
Bikumala et al.

(10) Patent No.: US 11,159,464 B2
(45) Date of Patent: Oct. 26, 2021

(54) SYSTEM AND METHOD FOR DETECTING AND REMOVING ELECTRONIC MAIL STORMS

(71) Applicant: DELL PRODUCTS, LP, Round Rock, TX (US)

(72) Inventors: Sathish Kumar Bikumala, Round Rock, TX (US); Hung The Dinh, Austin, TX (US); Sabu K. Syed, Austin, TX (US); Marcio Fragoso Stumpf Lena, Porto Alegre (BR); Vijaya Panguluru Sekhar, Bangalore (IN); Jatin Kamlesh Thakkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 16/530,032

(22) Filed: Aug. 2, 2019

(65) Prior Publication Data
US 2021/0036976 A1 Feb. 4, 2021

(51) Int. Cl.
*G06F 12/14* (2006.01)
*G06F 15/16* (2006.01)
*H04L 12/58* (2006.01)

(52) U.S. Cl.
CPC .............. *H04L 51/12* (2013.01); *H04L 51/22* (2013.01)

(58) Field of Classification Search
CPC ................................ H04L 51/12; H04L 51/22
USPC ......................................................... 709/206
See application file for complete search history.

(56) References Cited

U.S. PATENT DOCUMENTS

| | | | |
|---|---|---|---|
| 7,490,131 B2 * | 2/2009 | Mailer | H04L 51/12 709/206 |
| 8,966,503 B1 | 2/2015 | Dyer et al. | |
| 9,268,652 B1 * | 2/2016 | Salyers | G06F 12/0804 |
| 9,559,889 B1 * | 1/2017 | Vincent | H04L 67/2842 |
| 9,559,999 B1 * | 1/2017 | Auchmoody | G06Q 10/107 |
| 10,050,925 B1 * | 8/2018 | Showalter | H04L 51/34 |
| 10,097,488 B2 | 10/2018 | Deepaganesh | |
| 10,135,844 B2 * | 11/2018 | Jiang | H04L 63/1458 |
| 2002/0174185 A1 * | 11/2002 | Rawat | H04L 67/306 709/206 |
| 2005/0081059 A1 * | 4/2005 | Bandini | H04L 51/12 726/4 |
| 2005/0125276 A1 | 6/2005 | Rusu | |
| 2006/0031305 A1 * | 2/2006 | Keohane | H04L 51/22 709/206 |

(Continued)

*Primary Examiner* — Kevin T Bates
*Assistant Examiner* — Golam Mahmud
(74) *Attorney, Agent, or Firm* — Larson Newman, LLP

(57) ABSTRACT

An information handling system determines context features for an electronic mail message based on a payload of the electronic mail message. A processor adds the context features to the payload of the electronic mail message to create an updated payload. Based on the updated payload, the processor sets a quarantine indication for the electronic mail message to either a first state or a second state. In response to the quarantine indication for the electronic mail message being in the first state, the processor assigns the electronic mail message to an electronic mail storm. In response to the assigning of the electronic mail message being to the electronic mail storm, the processor quarantines the electronic mail message.

20 Claims, 6 Drawing Sheets

| | Individuals Addressed in email 302 | Distribution Group Type 304 | Mail Intent Type 306 | Presence of Response Trigger 308 | Identified Pattern Presence 310 | Pattern Repetition 312 | Quarantine 314 |
|---|---|---|---|---|---|---|---|
| Email 320 | 250 | Generic | Reminder | NO | YES | YES | YES |
| Email 322 | 30 | Specific | Business | YES | YES | NO | NO |
| Email 324 | 300 | Specific | Social | YES | NO | YES | YES |
| Email 326 | 1000 | Generic | Announce | NO | YES | NO | YES |

(56) References Cited

U.S. PATENT DOCUMENTS

| | | | | |
|---|---|---|---|---|
| 2006/0224750 A1* | 10/2006 | Davies | | H04W 4/12 709/229 |
| 2006/0282888 A1* | 12/2006 | Bandini | | H04L 51/12 726/14 |
| 2007/0220607 A1* | 9/2007 | Sprosts | | H04L 51/12 726/24 |
| 2009/0157708 A1* | 6/2009 | Bandini | | H04L 51/12 |
| 2009/0222922 A1* | 9/2009 | Sidiroglou | | H04L 51/12 726/23 |
| 2009/0240774 A1* | 9/2009 | Sachtjen | | H04W 12/069 709/206 |
| 2010/0005146 A1* | 1/2010 | Drako | | G06Q 10/00 709/206 |
| 2010/0036922 A1* | 2/2010 | Stafford | | G06Q 10/107 709/206 |
| 2011/0213850 A1* | 9/2011 | Umeshima | | H04L 51/063 709/206 |
| 2011/0231502 A1* | 9/2011 | Umeshima | | H04L 51/12 709/206 |
| 2011/0252104 A1* | 10/2011 | Nachum | | H04L 63/02 709/206 |
| 2012/0150965 A1* | 6/2012 | Wood | | H04L 61/307 709/206 |
| 2012/0166458 A1* | 6/2012 | Laudanski | | H04L 51/12 707/755 |
| 2013/0212200 A1* | 8/2013 | Dennis | | H04L 51/22 709/206 |
| 2014/0026182 A1* | 1/2014 | Pearl | | G06F 21/554 726/1 |
| 2016/0261531 A1* | 9/2016 | Bronicki | | H04L 51/12 |
| 2016/0277368 A1* | 9/2016 | Narayanaswamy | | H04L 63/0281 |
| 2016/0306812 A1* | 10/2016 | McHenry | | G06Q 10/10 |
| 2016/0373392 A1* | 12/2016 | Kamal | | H04L 61/1564 |
| 2017/0063767 A1* | 3/2017 | Lukas | | H04L 51/22 |
| 2017/0272388 A1* | 9/2017 | Bern | | H04L 51/12 |
| 2017/0302671 A1* | 10/2017 | Rivelli | | H04L 51/18 |
| 2017/0364971 A1* | 12/2017 | Lyons | | H04L 51/02 |
| 2018/0107959 A1 | 4/2018 | Gamare et al. | | |
| 2018/0234368 A1* | 8/2018 | Everton | | H04L 51/12 |
| 2018/0234375 A1* | 8/2018 | Gray | | G06F 16/285 |
| 2019/0012629 A1* | 1/2019 | Yan | | H04L 51/24 |
| 2019/0081983 A1* | 3/2019 | Teal | | H04L 63/0236 |
| 2019/0098026 A1* | 3/2019 | Mishra | | H04L 63/1416 |
| 2019/0173892 A1* | 6/2019 | Kemp | | H04L 63/1408 |
| 2019/0364001 A1* | 11/2019 | Dotan-Cohen | | H04L 51/24 |
| 2020/0007502 A1* | 1/2020 | Everton | | H04L 51/063 |
| 2020/0106876 A1* | 4/2020 | Keen | | G06F 16/20 |

* cited by examiner

| | Individuals Addressed in email 302 | Distribution Group Type 304 | Mail Intent Type 306 | Presence of Response Trigger 308 | Identified Pattern Presence 310 | Pattern Repetition 312 | Quarantine 314 |
|---|---|---|---|---|---|---|---|
| Email 320 | 250 | Generic | Reminder | NO | YES | YES | YES |
| Email 322 | 30 | Specific | Business | YES | YES | NO | NO |
| Email 324 | 300 | Specific | Social | YES | NO | YES | YES |
| Email 326 | 1000 | Generic | Announce | NO | YES | NO | YES |

*FIG. 3*

SYSTEM AND METHOD FOR DETECTING AND REMOVING ELECTRONIC MAIL STORMS

FIELD OF THE DISCLOSURE

The present disclosure generally relates to information handling systems, and more particularly relates to detecting and removing electronic mail storms.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may determine context features for an electronic mail message based on a payload of the electronic mail message. A processor may add the context features to the payload of the electronic mail message to create an updated payload. Based on the updated payload, the processor may set a quarantine indication for the electronic mail message to either a first state or a second state. In response to the quarantine indication for the electronic mail message being in the first state, the processor may assign the electronic mail message to an electronic mail storm. In response to the assigning of the electronic mail message being to the electronic mail storm, the processor may store the electronic mail message in a quarantine location.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a table include context features for an electronic mail message according to at least one embodiment of the disclosure;

The use of the same reference symbols in different drawings indicates similar or identical items.

DETAILED DESCRIPTION OF THE DRAWINGS

Figure 1:
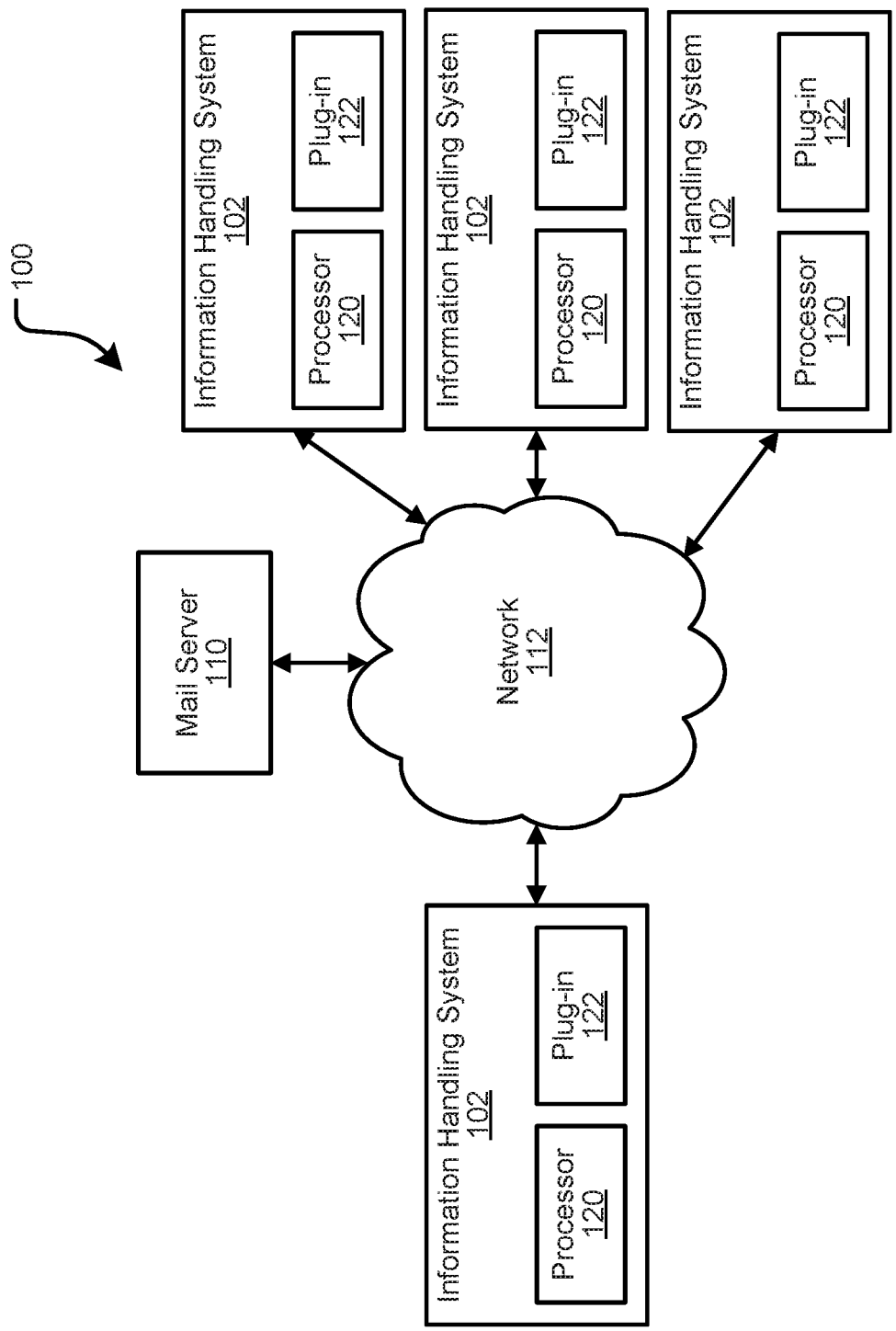
FIG. 1 is a block diagram of an electronic mail message system according to at least one embodiment of the disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system includes a memory having machine-executable code, and a processor configured to execute the code. The processor determines a plurality of context features for an electronic mail message based on a payload of the electronic mail message. The processor adds the context features to the payload of the electronic mail message to create an updated payload. Based on the updated payload, the processor sets a quarantine indication for the electronic mail message to either a first state or a second state. In response to the quarantine indication for the electronic mail message being in the first state, the processor assigns the electronic mail message to an electronic mail storm. In response to the assigning of the electronic mail message being to the electronic mail storm, the processor stores the electronic mail message in a first region of a computer memory that is a quarantine location.

The information handling system disclosed herein to detect and remove electronic mail storms provides various advantages and benefits over other systems that distribute electronic mail messages. In particular, systems disclosed herein may utilize data within the payload of an electronic mail message to determine whether the electronic mail message is part of an electronic mail message storm and automatically quarantine the electronic mail message if determined to be part of an electronic mail message storm. In particular, the system may determine context features based on the payload of the electronic mail message and set a quarantine field within the payload to either a first or second state based on an analysis of the context features. If the quarantine field is set to the first state, the system may determine that the electronic mail message is part of an electronic mail message storm and automatically quarantine the electronic mail message. Previously, in an attempt to limit electronic mail message storms, electronic mail systems would notify users when an electronic mail message was addresses to a large number of recipients, enable users to disable a reply all feature, limit what senders could send an electronic mail message to a distribution list, hide distribution lists from address books, and create transport rules to drop particular messages. However, all of these features of previous electronic mail systems required an individual to actively perform one or more steps to limit an electronic mail message storm. Therefore, the systems disclosed herein improve an information handling system by providing an optimized, systematic, and programmatic process to detect and remove electronic mail message storms.

FIG. 1 shows an electronic mail (e-mail) message system 100 implemented on various information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

The e-mail message system 100 includes information handling systems 102, 104, 106, and 108 (102-108), an e-mail server 110, and a network 112. Each of information handling systems 102-108 are in communication with one other and with e-mail server 110 via network 112. Each of information handling systems 102-108 includes a processor 120 and a plug-in application 122. Information handling systems 102-108 may include personal computers, laptop computers, tablet devices, smart phones, or other information handling systems, as needed or desired.

Each of information handling systems 102-108 can send e-mail messages to one of the other information handling systems via e-mail server 110, or can send e-mail messages directly to the other information handling systems via a client-to-client communication. For simplicity, only communications between network 112 and each of information handling systems 102-108 and e-mail server 110 are shown in FIG. 1. In an embodiment, e-mail message system 100 may include a multitude of additional information handling systems that may communicate with information handling systems 102-108 and server 110 via network 112 without varying from the scope of this disclosure.

Network 112 represents a network fabric that operates to permit the passing of information between the connected elements in accordance with a particular network communication standard. In a particular embodiment, network 112 represents the Internet, and one or more of information handling systems 102-108 and e-mail server 110 are publicly accessible. Here, security measures, as are known in the art, may be employed to maintain the integrity and confidence of the information communicated in e-mail message system 100, such as Virtual Private Network (VPN) tunneling, data encryption, and the like. In another embodiment, network 112 represents a private intranet. Here, one or more of information handling systems 102-108 and e-mail server 110 can also be connected to the Internet or another network, as needed or desired. In another embodiment, network 112 represents a combination of the Internet and a private intranet or other network, as needed or desired.

E-mail server 110 can receive e-mails addressed to or from one or information handling systems including, but not limited to, information handling systems 102-108. When the e-mail is received, e-mail server 110 can save a copy of the e-mail in a local memory of the mail server and then send the e-mail to the destination information handling systems including, but not limited to, information handling systems 102-108. The e-mail can either be pushed to or pulled by the corresponding information handling system 102-108.

During operation, an individual associated with one of information handling systems 102-108 may send an e-mail to an entire e-mail distribution list. In an example e-mail, as used herein, represents information that is created, drafted, or written by a first user, identified by a first e-mail address, that is addressed and set to one or more other users, identified by respective e-mail addresses, and that formats the information, the e-mail addresses, and other information into a particular document markup language. For example, an e-mail can be formatted using plain text, using a Rich Text Format (RTF), or another e-mail format, as needed or desired. In certain examples, an e-mail sent from one or information handling systems 102-108 may be any suitable type of e-mail, such as a controversial or misdirected message, that may result in a sudden spike of 'reply all' e-mail messages, such as an e-mail storm, on e-mail message system 100. As a result of the sudden spike of 'reply all' e-mail messages within e-mail message system 100, an amount of e-mail traffic through e-mail server 110 may render the e-mail server inoperative. Thus, information handling systems 102-108 may perform one or more operations to detect and remove e-mails that are part of an e-mail storm to improve the operation of the information handling systems 102-108 and e-mail server 110.

Figure 2:
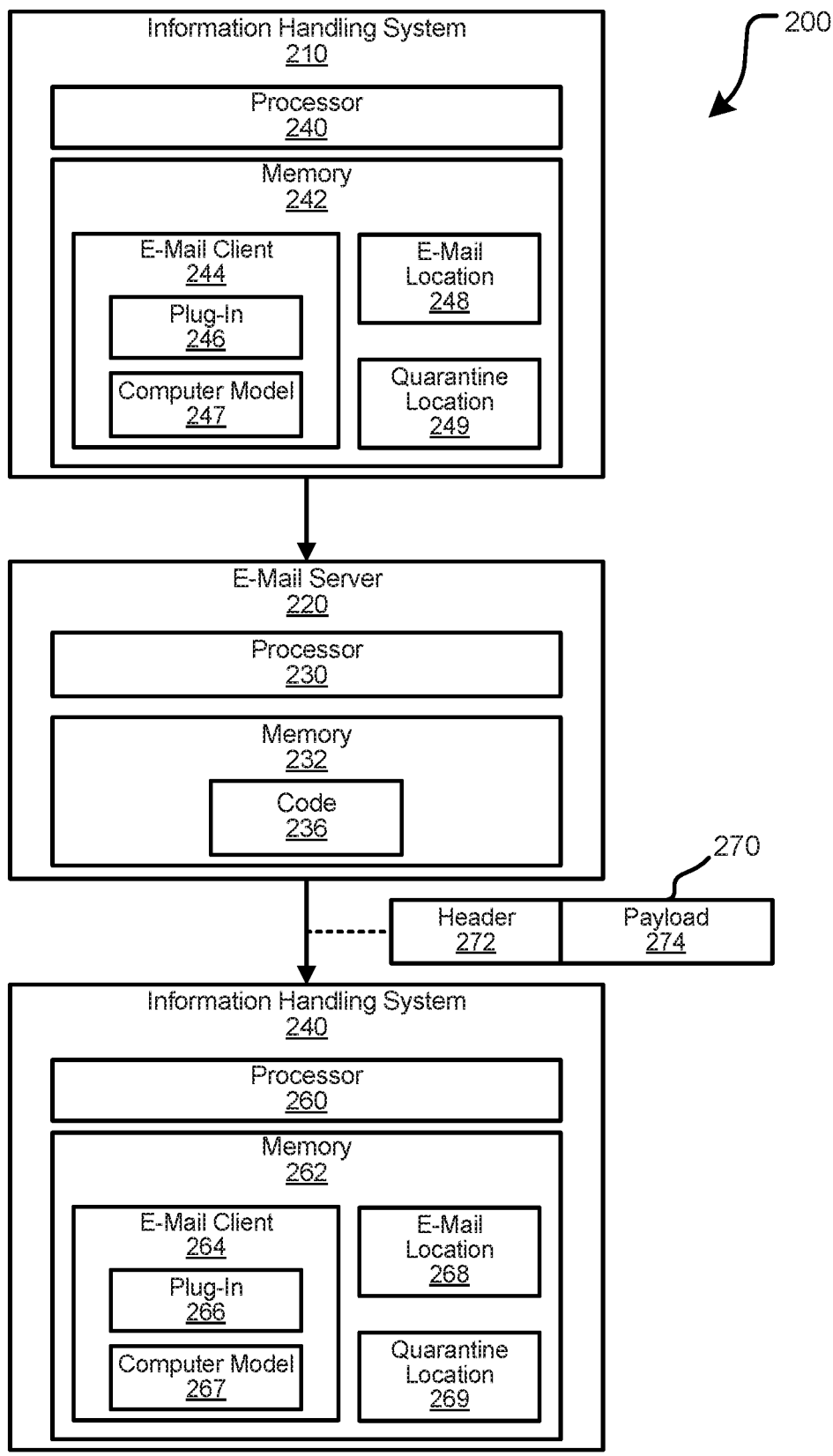
FIG. 2 is a block diagram of a portion of an electronic mail message system according to at least one embodiment of the disclosure.
Figure 6:
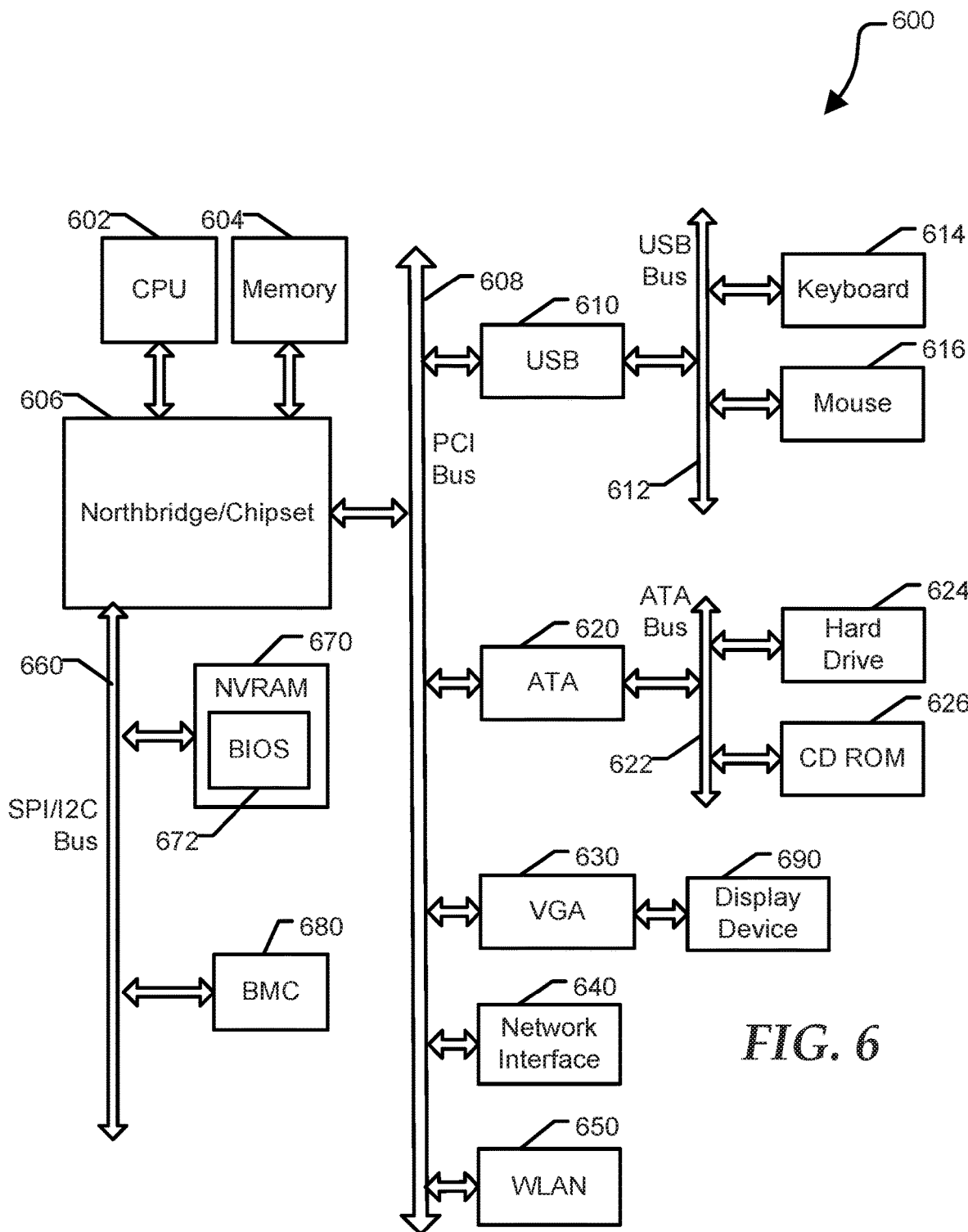
FIG. 6 is a block diagram of a general information handling system according to an embodiment of the present disclosure.

In an embodiment, processor 120 of one or more of information handling systems 102-108 may execute code stored in a computer memory of the information handling system, such as memories 242 and 262 of FIG. 2, and memory 604 of FIG. 6, to perform one or more operations to determine whether an e-mail is part of an e-mail storm. For example, processor 120 may execute plug-in 122 to determine context features for the e-mail. Based on the context features, plug-in 122 may determine whether the e-mail is associated with an e-mail storm. If so, processor 120 may remove the e-mail from e-mail message system 100 as will be described with respect to FIGS. 2 and 3 below.

FIG. 2 illustrates an e-mail system 200 including an information handling system 210, an e-mail server 220, and an information handling system 230. Information handling system 210 includes a processor 240 and a memory 242 to store an e-mail client 244, e-mail server 220 includes a processor 230 and a memory 232 to store code 236, and information handling system 230 includes a processor 260 and a memory 262 to store an e-mail client 264. E-mail clients 244 and 264 represent programs or applications, such as plug-ins 246 and 266, to facilitate the creation, editing, sending, routing, receiving, and displaying of electronic communications (e-mails) between a sender and one or more recipients. Similarly, code 236 represents programs or applications, such as plug-ins 246 and 266, to facilitate the creation, editing, sending, routing, receiving, and displaying of e-mails between a sender and one or more recipients. In particular, e-mail clients 244 and 264 and e-mail server 220 operate at the application layer (L7) of the Open System Interconnect (OSI) model to send, receive, and route e-mails over a Transmission Control Protocol/Internet Protocol (TCCP/IP) connection between information handling system 210, e-mail server 220, and information handling system 230. As such, e-mail clients 244 and 264 and e-mail server 220 operate in accordance with one or more operating standards for e-mail communication. An example of an operating standard for e-mail communication includes a Post Office Protocol version 3 (POP3) standard or an Internet Message Access Protocol (IMAP) standard for receiving e-mails, a Simple Mail Transfer Protocol (SMTP) standard for sending e-mails, a Multi-Purpose Internet Mail Extensions (MIME) standard for e-mail formatting, or other e-mail communication standards, as needed or desired. Details of the standards for e-mail communication will not be described further herein, except as needed to show the functions and features of the present disclosure.

E-mail clients 244 and 264 represent an integrated e-mail management program or application that may provide a graphical user interface for the management of the creation, composition, addressing, and sending of e-mail to the one or more recipients. An example of e-mail clients 244 and 264 includes various Windows-based e-mail clients such as Microsoft Outlook or Windows Mail for a Microsoft Windows operating environment, various MacOS-based e-mail clients such as AppleMail, various cross-platform or web-based e-mail clients such as G-Mail, Yahoo Mail, or AOL mail, or another e-mail client, as needed or desired. In a particular embodiment, e-mail clients 244 and 264 represent a portion of a larger integrated productivity platform operating on information handling system 210 and information handling system 230, that operate to manage other e-mail related activities such as the storage, filing, and archiving of received e-mail, document creation, contacts management, calendar and event management, and other office productivity activities.

While only information handling systems 210 and 230 are shown in e-mail system 200, multiple additional information handling systems may be included without varying from the scope of the disclosure. For clarity and brevity, detection and removal of an e-mail associated with an e-mail storm will be discussed with respect to information handling system 210 and information handling system 230 instead of multiple additional information handling systems.

In an embodiment, an individual may utilize information handling system 210 to send an e-mail 270 to one or more other information handling systems including, but not limited to, information handling system 230. In an example, processor 240 of information handling system 210 may perform one or more suitable operations to create and send e-mail 270. For example, processor 240 may execute e-mail client 244 to create a header 272 and a payload 274 for e-mail 270. In an example, header 272 may identify one or more e-mail addresses to send e-mail 270, identify the sending e-mail address, and any other suitable information or data associated with the e-mail. Payload 274 may include data for e-mail 270 including, but not limited to, the number of recipients for the e-mail and content of the e-mail. In an example, the content of e-mail 270 may be text, pictures, other graphics, or the like.

Upon e-mail client 244 completing e-mail 270, the e-mail may be sent to e-mail server 220 for distribution to the designated recipients. E-mail server 220 may perform one or more suitable operations to determine the recipients of e-mail 270 and provide the e-mail to those recipients. For example, processor 230 may execute code 236 within memory 232 to determine from header 272 one or more recipient e-mail addresses for e-mail 207. Processor 230 may utilize the recipient e-mail addresses to determine one or more IP addresses associated with the recipient e-mail addresses, and transmit the e-mail to those IP addresses.

Information handling system 230 may receive e-mail 270 and processor 260 may perform any suitable operations to determine whether the e-mail is associated with an e-mail storm before providing the e-mail in a graphical user interface on a display device, such as display device 690 of FIG. 6, for viewing by an individual. In an example, processor 260 may execute code stored within memory 262, such as plug-in 266, to determine whether e-mail 270 is associated with an e-mail storm. For example, processor 260 may analyze payload 274 to make this determination.

In an embodiment, processor 260 may analyze payload 274 to determine one or more context features for e-mail 270. In an example, the context features may be information associated with an e-mail that may be utilized to determine whether the e-mail is part of an e-mail storm and should therefore be quarantined. In an embodiment, the context features may be any suitable information for classifying the e-mail including, but not limited to, a number of individuals addressed in the e-mail, a distribution group type, an e-mail intent type, a presence of a response trigger, an identified pattern presence, and a pattern repetition. The context features will now be described with respect to FIG. 3.

FIG. 3 illustrates a table 300 showing a number of columns 302, 304, 306, 308, 310, 312, and 314 (302-314) and each column is associated with a different context feature for an e-mail according to at least one embodiment of the disclosure. Each of the columns 302-314 may be associated with a different context feature. For example, a number of individuals addressed in the e-mail column 302, a distribution group type column 304, an e-mail intent type column 306, a presence of a response trigger column 308, an identified pattern presence column 310, a pattern repetition column 312, and a quarantine column 314. Additionally, table 300 may include multiple rows 320, 322, 324, and 326, and each row may be associated with a different e-mail. During the analysis of the payload of an e-mail, each field within a row 320, 322, 324, or 326 may be determined and a corresponding data value may be stored within the field. In an embodiment, a row of data within table 300 may be determined for a particular e-mail and each field within the row may be added to the payload of the e-mail. For example, row 320 for a particular e-mail may include the following data in the fields of the row: '250' in the number of individuals addressed in the e-mail column 302, 'generic' in the distribution group type column 304, 'reminder' in the e-mail intent type column 306, 'no' in the presence of a response trigger column 308, 'yes' in the identified pattern presence column 310, 'yes' in the pattern repetition column 312, and 'yes' in the quarantine column 314.

Referring now to FIG. 2, in response to receiving e-mail 270, processor 260 may automatically execute plug-in 266 to determine the context features for e-mail 270 and create a set of fields to add to payload 274. For example, processor 260 may determine, in any suitable manner, that e-mail 270 is addressed to 250 individuals and store corresponding data in a field associated with the individual addressed in the e-mail column 302 of row 320 as shown in FIG. 3. Processor 260 may also analyze the addresses associated with e-mail 270 to determine a distribution group type, such as generic, specific, or the like, for the e-mail. For example, processor 260 may store generic in a field associated with the distribution group type column 304 of row 320 as shown in FIG.

3. Processor 260 may analyze an intent type for e-mail 270 in any suitable manner including, but not limited to, scanning the text within payload 274 to look for keywords that may identify intent of the e-mail, such as a reminder e-mail, a business e-mail, a social e-mail, an announcement e-mail, or the like. For example, processor 260 may store data indicating 'reminder' in a field associated with the distribution group type column 306 of row 320 as shown in FIG. 3.

Processor 260 may determine whether e-mail 270 includes a response trigger by scanning payload 274 to look for keywords that may trigger a response to the e-mail, such as what do you think, opinion, advice, or the like. Thus, processor 260 may determine whether payload 274 includes text indicative that a response is triggered by e-mail 270. For example, processor 260 may store data indicating 'NO' in a field associated with the distribution group type column 308 of row 320 as shown in FIG. 3. Additionally, processor 260 may analyze whether e-mail 270 includes pre-identified patterns that indicate the e-mail is associated with an e-mail storm in any suitable manner including, but not limited to, scanning the text within payload 274. In an embodiment, pre-identified words or phrases indicating that an e-mail is associated with an e-mail storm includes, but is not limited to, remove me from chain, and me too. Based on this analysis, processor 260 may store whether an identified pattern was found within payload 274. For example, processor 260 may store data indicating 'YES' in a field associated with the identified pattern presence column 310 of row 320 as shown in FIG. 3. Processor 260 may analyze whether an identified pattern is repeated within payload 274 of e-mail 270 in any suitable manner including, but not limited to, scanning the text within the payload to look for multiple occurrences of the keywords or phrases associated with identified patterns. Based on this analysis, processor 260 may store whether an identified pattern is repeated within payload 274. For example, processor 260 may store data indicating 'YES' in a field associated with the pattern repetition column 312 of row 320 as shown in FIG. 3.

In an embodiment, based on the context features, processor 260 may perform any suitable operations to determine whether e-mail 270 is part of an e-mail storm and should be quarantined. In an example, processor 260 may provide the determined context features as an input to a computer model, such a computer model 267 stored within memory 264, which in turn may output whether e-mail 270 should be quarantined. In an embodiment, computer model 267 may include an input layer to receive the context features for e-mail 270, any number of hidden layers, and an output layer to provide a determination of whether e-mail 270 is part of an e-mail storm. Based on the determination output by computer model 267, processor 260 may set a field within the quarantine column 314 to either a first state or a second state. In an example, the first state may indicate that e-mail 270 is part of an e-mail storm and should be quarantined, and the second state may indicate that the e-mail is not part of an e-mail storm and does not need to be quarantined.

In response to the field within the quarantine column being set, processor 260 may perform any suitable operations to store e-mail 270 either in an e-mail location 268 of memory 262 or a quarantine location 269 of memory 262. In an example, processor 260 may execute plug-in 266 to automatically store e-mail 270 in either e-mail location 268 or quarantine location 269. For example, if the field of quarantine column is in the second state, processor 260 may automatically store e-mail 270 within e-mail location 268. However, if the field of quarantine column is in the first state, processor 260 may automatically store e-mail 270 within quarantine location 269. In an embodiment, e-mail location 268 is a region of memory 262 where e-mails that are not part of an e-mail storm are stored, and e-mails in this region may be populated into an inbox of an e-mail service of information handling system 230. In an embodiment, quarantine location 269 is a region of memory 262 where e-mails that are part of an e-mail storm are stored, and e-mails in this region are not populated into the inbox of the e-mail service of information handling system 230.

In an example, if the field of quarantine column is in the first state, processor 260 may automatically block e-mail 270 and place a hold on the e-mail for a particular amount of time. In an embodiment, the particular amount of time may be a period of time that an individual, such as an administrator, has to either approve e-mail 270 to be delivered to the inbox of the e-mail delivery system, or disapprove the e-mail being delivered to the inbox of the e-mail delivery system. In response to e-mail 270 being placed on hold, processor 260 may notify, in any suitable manner, the individual or administrator to classify the e-mail either as part of an e-mail storm or not, such that the e-mail is delivered to the inbox or not. In an example, processor 240 may send e-mail 270 to a particular folder within the e-mail system that has previously been identified as a folder to store e-mails in need of classification. In an additional or alternative example, processor 240 may provide a pop-up on a display device, such as display device 690 of FIG. 6, and the pop-up may include information associated with e-mail 270 to enable the individual to determine whether the e-mail is part of an e-mail storm. The pop-up may include soft buttons to allow the individual to select 'yes' or 'no' with respect to whether e-mail 270 is part of an e-mail storm. In response to the classification of e-mail 270 by the individual, processor 260 store e-mail 270 in either e-mail location 268 or quarantine location 269. For example, in response to the individual classifying e-mail 270 as not being part of an e-mail storm, processor 260 may store the e-mail in e-mail location 268. However, in response to the individual classifying e-mail 270 as part of an e-mail storm, processor 260 may store the e-mail in quarantine location 269.

In an embodiment, processor 260 may perform one or more operations to remove the context features from payload 274 before e-mail 270 is stored in one of e-mail location 268 and quarantine location 269. In this embodiment, if a reply e-mail message is sent based on e-mail 270, an information handling system, such as information handling system 210, will not have access to the context features determined by information handling system 230 during a determination of whether the reply e-mail is part of an e-mail storm. In this situation, the information handling system may determine context features for the reply e-mail, which may be used to determine whether the reply e-mail is part of an e-mail storm.

In an additional or alternative example, information handling system 210 may receive an e-mail and processor 240 may execute plug-in 246 and computer model 247 to determine whether to store the e-mail in e-mail location 248 or quarantine location 249 of memory 242 in substantially the same manner as described above with respect to processor 260, plug-in 266, and computer model 267.

In an additional or alternative example, processor 260 may not remove the context features from payload 274 and may provide e-mail 270 to other information handling systems, such as information handling system 210, so that the other information handling systems may utilize, in any suitable manner, the context features determined by processor 260. In an example, information handling system 210 may receive a reply e-mail from information handling system 230 and multiple other reply e-mails from other information handling systems, and the reply e-mails may include the context features within the payload of the reply e-mails. Upon processor 240 determining whether the reply e-mail is part of an e-mail storm, processor 240 may utilize the quarantine field of the context features of each reply e-mail from each information handling system to determine whether to quarantine the reply e-mail. In an example, processor 240 may determine a weighted average of the quarantine determinations from multiple other information handling systems and its own determination, to set the quarantine field in either the first state or the second state. Upon the weighted average being used to set the quarantine field of the reply e-mail, the information handling system may store the reply e-mail in the e-mail location or quarantine location of a memory as described above.

Figure 4:
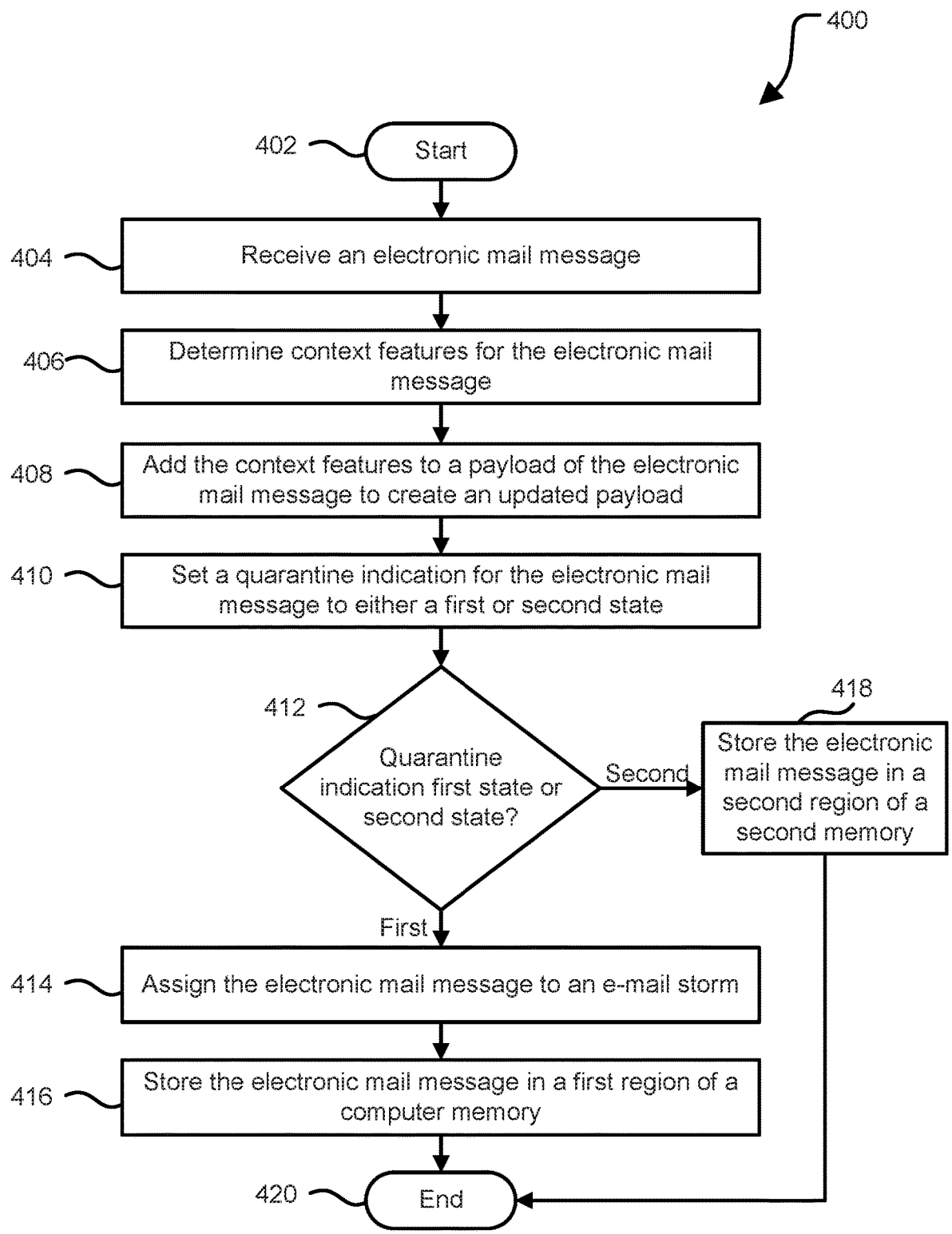
FIG. 4 is a flow diagram of a method for detecting and removing electronic mail storms according to at least one embodiment of the disclosure.

FIG. 4 is a flow diagram of a method 400 for detecting and removing electronic mail storms according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 400 of FIG. 4 may be executed to perform an optimized, systematic, and programmatic process to determine whether an e-mail message is part of an e-mail storm.

The method starts at block 402. At block 404, an e-mail message is received. Block 404 may be performed in a manner described above. At block 406, context features for the e-mail message are determined. Block 406 may be performed in a manner described above. In an example, the context features may be determined based on a payload of the e-mail message.

At block 408, the context features are added to the payload of the e-mail message to create an updated payload. Block 408 may be performed in a manner described above. In an example, the context features may be added a different fields within the payload. In an embodiment, the context features may include, but are not limited to, a number of individuals addressed in the e-mail, a distribution group type, an e-mail intent type, a presence of a response trigger, an identified pattern presence, and a pattern repetition.

At block 410, a quarantine indication for the e-mail message is set to either a first state of a second state. Block 410 may be performed in a manner described above. In an embodiment, the quarantine indication is set based on the updated context features. At block 412, a determination is made whether the quarantine indication is in the first state or the second state. Block 412 may be performed in a manner described above. If the quarantine indication is in the second state, the method continues at block 418. However, if the quarantine indication is in the first state, the method continues at block 414.

At block 414, the e-mail message is assigned to an e-mail storm. Block 414 may be performed in a manner described above. In an example, a processor of an information handling system may automatically assign the e-mail message to an e-mail storm. In an embodiment, an individual may make a selection to assign the e-mail message to the e-mail storm. At block 416, the e-mail message is stored in a first region of a computer memory. Block 416 may be performed in a manner described above. In an embodiment, the first region of the computer memory may be a quarantine location of the computer memory where e-mail messages associated with an e-mail storm are stored so that these e-mail messages are removed from the e-mail system.

At block 418, in response to the quarantine indication being in the second state, the e-mail message is stored in a second region of the computer memory. Block 418 may be performed in a manner described above. In an embodiment, the second region of the computer memory may be an e-mail location of the computer memory where e-mail messages that are not associated with an e-mail storm are stored so that these e-mail messages may be provided to an inbox of the e-mail system. The flow ends at block 420.

Figure 5:
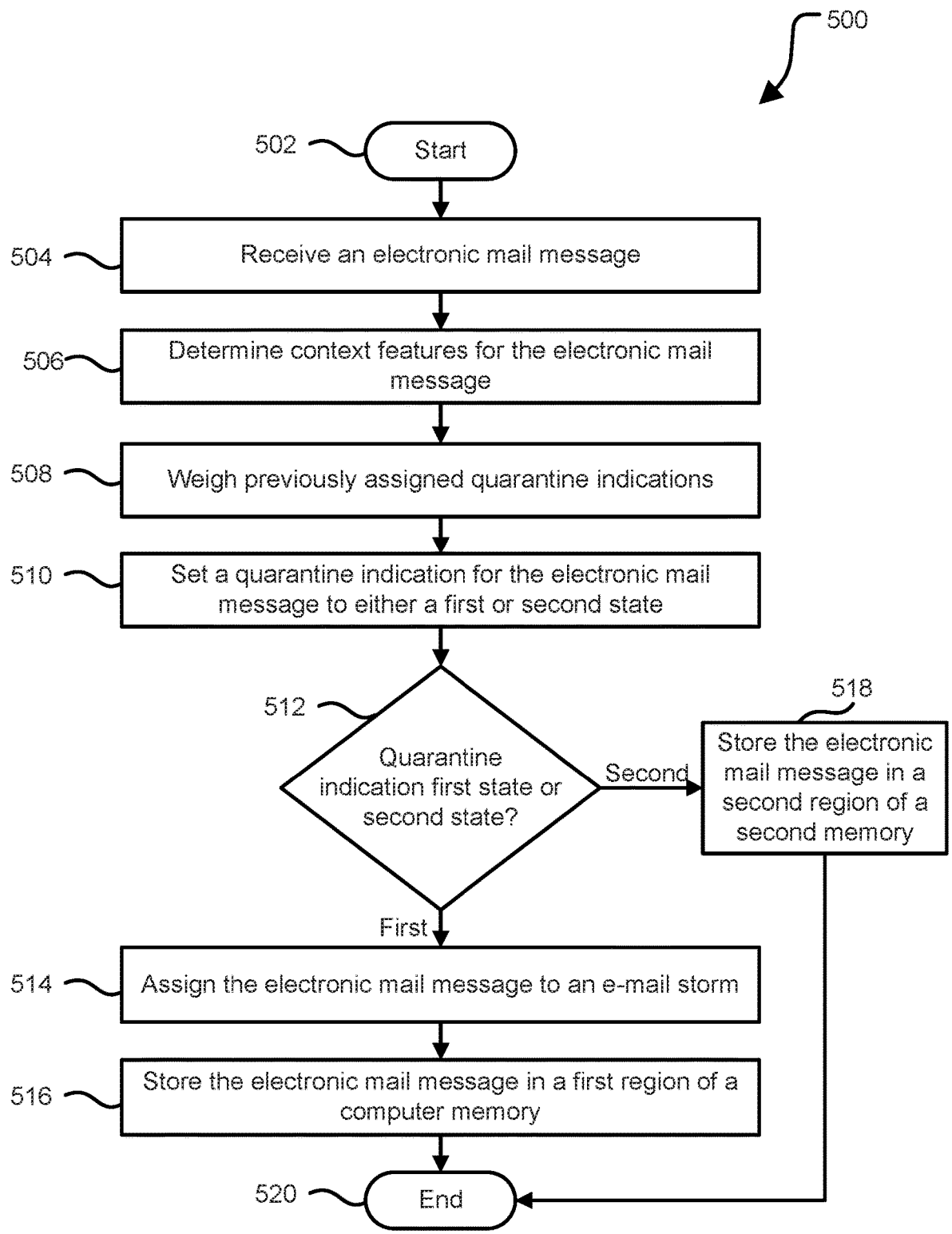
FIG. 5 is a flow diagram of another method for detecting and removing electronic mail storms according to at least one embodiment of the disclosure.

FIG. 5 is a flow diagram of a method 500 for detecting and removing electronic mail storms according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 500 of FIG. 5 may be executed to perform an optimized, systematic, and programmatic process to determine whether an e-mail message is part of an e-mail storm.

The method starts at block 502. At block 504, an e-mail message is received. Block 504 may be performed in a manner described above. At block 506, context features for the e-mail message are determined. Block 506 may be performed in a manner described above. In an example, the context features may be determined based on a payload of the e-mail message. In an embodiment, the context features may include, but are not limited to, a number of individuals addressed in the e-mail, a distribution group type, an e-mail intent type, a presence of a response trigger, an identified pattern presence, and a pattern repetition.

At block 508, previously assigned quarantine indications are weighed. Block 508 may be performed in a manner described above. In an example, the previously assigned quarantine indications may be assigned to the payload of the e-mail message by other information handling systems. At block 510, a quarantine indication for the e-mail message is set to either a first state of a second state. Block 510 may be performed in a manner described above. In an embodiment, the quarantine indication is set based on the context features and the weighted average of the previously assigned quarantine indications. At block 512, a determination is made whether the quarantine indication is in the first state or the second state. Block 512 may be performed in a manner described above. If the quarantine indication is in the second state, the method continues at block 518. However, if the quarantine indication is in the first state, the method continues at block 514.

At block 514, the e-mail message is assigned to an e-mail storm. Block 514 may be performed in a manner described above. In an example, a processor of an information handling system may automatically assign the e-mail message to an e-mail storm. In an embodiment, an individual may make a selection to assign the e-mail message to the e-mail storm. At block 516, the e-mail message is stored in a first region of a computer memory. Block 516 may be performed in a manner described above. In an embodiment, the first region of the computer memory may be a quarantine location of the computer memory where e-mail messages associated with an e-mail storm are stored so that these e-mail messages are removed from the e-mail system.

At block 518, in response to the quarantine indication being in the second state, the e-mail message is stored in a second region of the computer memory. Block 518 may be performed in a manner described above. In an embodiment, the second region of the computer memory may be an e-mail location of the computer memory where e-mail messages that are not associated with an e-mail storm are stored so that these e-mail messages may be provided to an inbox of the e-mail system. The flow ends at block 520.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. In an embodiment, information handling system 600 may be one or more of information handling systems 102-108 of FIG. 1, e-mail server 110 of FIG. 1, information handling systems 210 and 240 of FIG. 2, and e-mail server 220 of FIG. 2. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of skill will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. For example, device controller 630 may provide data to a display device 690 to visually present the information to an individual associated with information handling system 600. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving, by a processor, an electronic mail message;
    determining a plurality of context features for the electronic mail message based on a payload of the electronic mail message, wherein the context features include data indicating a number of individuals addressed in the electronic mail message, wherein the data is stored in a field of the payload;
    adding the context features to the payload of the electronic mail message to create an updated payload;
    setting, by the processor and based on the updated payload, a quarantine indication for the electronic mail message to either a first state or a second state;
    in response to the quarantine indication for the electronic mail message being in the first state, assigning the electronic mail message to an electronic mail storm; and
    in response to the assigning of the electronic mail message being to the electronic mail storm, storing, by the processor, the electronic mail message in a first region of a computer memory, wherein the first region is a quarantine location of the computer memory.

2. The method of claim 1, wherein the storing of the electronic mail message in the quarantine location of the computer memory further comprises:
    providing a notification to an individual that the quarantine indication for the electronic mail message is in the first state;
    receiving a selection from the individual of whether to store the electronic mail message in the quarantine location; and
    in response to the selection from the individual indicating to store the electronic mail message in the quarantine location, storing the electronic mail message in the first region of the computer memory.

3. The method of claim 1, further comprising:
    in response to the quarantine indication for the electronic mail message being in the second state, storing, by the processor, the electronic mail message in a second region of the computer memory, wherein the second region is an electronic mail location of the computer memory.

4. The method of claim 1, wherein the determining of the context features for the electronic mail message comprises:

determining, by the processor and based on the payload, whether the electronic mail message invokes a response from a recipient of the electronic mail message; and adding, to the context features for the electronic mail message, an indication of whether the reply mail message invokes the response from the recipient.

5. The method of claim 1, wherein the determining of the context features for the electronic mail message comprises:

determining, by the processor, a distribution group type for the electronic mail message; and adding the distribution group type to the context features for the electronic mail message.

6. The method of claim 1, wherein the determining of the context features for the electronic mail message comprises:

determining, by the processor, an intent type for the electronic mail message; and adding the intent type to the context features for the electronic mail message.

7. The method of claim 1, further comprising:

determining, by the processor, whether the payload includes previously identified patterns; and adding an indication of whether the payload includes the previously identified patterns to the context features.

8. The method of claim 1, further comprising:

determining, by the processor, whether the payload includes a repetition of a pattern; and adding, to the context features, an indication of whether the payload includes the repetition of the pattern.

9. An information handling system comprising:

a memory including machine-executable code; and a processor configured to execute the code to:

determine a plurality of context features for an electronic mail message based on a payload of the electronic mail message, wherein the context features include data indicating a number of individuals addressed in the electronic mail message, wherein the data is stored in a field of the payload;

add the context features to the payload of the electronic mail message to create an updated payload;

set, based on the updated payload, a quarantine indication for the electronic mail message to either a first state or a second state;

in response to the quarantine indication for the electronic mail message being in the first state, assign the electronic mail message to an electronic mail storm, wherein the electronic mail storm includes a sudden spike of reply all electronic mail messages; and in response to the assigning of the electronic mail message being to the electronic mail storm, store the electronic mail message in a first region of a computer memory, wherein the first region is a quarantine location of the computer memory.

10. The information handling system of claim 9, wherein the storing of the electronic mail message in the quarantine location of the computer memory includes the processor further to execute the code to:

provide a notification to an individual that the quarantine indication for the electronic mail message is in the first state;

receive a selection from the individual of whether to store the electronic mail message in the quarantine location; and in response to the selection from the individual indicating to store the electronic mail message in the quarantine location, store the electronic mail message in the first region of the computer memory.

11. The information handling system of claim 9, wherein the processor further to execute the code to:

in response to the quarantine indication for the electronic mail message being in the second state, store the electronic mail message in a second region of the computer memory, wherein the second region is an electronic mail location of the computer memory.

12. The information handling system of claim 9, wherein the determination of the context features for the electronic mail message includes the processor further to execute the code to:

determine, based on the payload, whether the electronic mail message invokes a response from a recipient of the electronic mail message; and add, to the context features for the electronic mail message, an indication of whether the reply mail message invokes the response from the recipient.

13. The information handling system of claim 9, wherein the determination of the context features for the electronic mail message includes the processor further to execute the code to:

determine a distribution group type for the electronic mail message; and add the distribution group type to the context features for the electronic mail message.

14. The information handling system of claim 9, wherein the determination of the context features for the electronic mail message includes the processor further to execute the code to:

determine an intent type for the electronic mail message; and add the intent type to the context features for the electronic mail message.

15. The information handling system of claim 9, wherein the processor further to execute the code to:

determine whether the payload includes previously identified patterns; and add an indication of whether the payload includes the previously identified patterns to the context features.

16. The information handling system of claim 9, wherein the determination of the context features for the electronic mail message includes the processor further to execute the code to:

determine whether the payload includes a repetition of a pattern; and add, to the context features, an indication of whether the payload includes the repetition of the pattern.

17. A method comprising:

receiving, by a processor, an electronic mail message;

determining a plurality of context features for the electronic mail message based on a payload of the electronic mail message, wherein the context features include data indicating a number of individuals addressed in the electronic mail message, wherein the data is stored in a field of the payload;

weighing previously assigned quarantine indications associated with the electronic mail message, wherein the previously assigned quarantine indications are received from a plurality of information handling systems;

setting, by the processor and based on the context features of the weighted previously assigned quarantine indications, an updated quarantine indication for the electronic mail message to either a first state or a second state;

if the updated quarantine indication for the electronic mail message is in the first state, then assigning the electronic mail message to an electronic mail storm; and if the electronic mail message is assigned to the electronic mail storm, then storing the electronic mail message in a first region of a computer memory, wherein the first region is a quarantine location of the computer memory.

18. The method of claim 17, wherein the storing of the electronic mail message in the quarantine location of the computer memory further comprises:

providing a notification to an individual that the quarantine indication for the electronic mail message is in the first state;

receiving a selection from the individual of whether to store the electronic mail message in the quarantine location; and in response to the selection from the individual indicating to store the electronic mail message in the quarantine location, storing the electronic mail message in the first region of the computer memory.

19. The method of claim 17, further comprising:

in response to the quarantine indication for the electronic mail message being in the second state, storing, by the processor, the electronic mail message in a second region of the computer memory, wherein the second region is an electronic mail location of the computer memory.

20. The method of claim 17, wherein the determining of the context features for the electronic mail message comprises:

determining, by the processor and based on the payload, whether the electronic mail message invokes a response from a recipient of the electronic mail message; and adding, to the context features for the electronic mail message, an indication of whether the reply mail message invokes the response from the recipient.

* * * * *